United States Patent [19]
Blatz

[11] 3,759,370
[45] Sept. 18, 1973

[54] DISPOSABLE PROBE COVER AND METHOD FOR MAKING SAME
[75] Inventor: Robert A. Blatz, Clayton, Calif.
[73] Assignee: Handgards, Inc., Pittsburg, Calif.
[22] Filed: Apr. 7, 1971
[21] Appl. No.: 131,949

[52] U.S. Cl............................. 206/16.5, 206/56 AB
[51] Int. Cl............................................. B65d 85/20
[58] Field of Search................... 128/260; 206/16.5, 206/16.6, 56 A, 56 AA, 56 AB, 63.2 R, DIG. 18

[56] References Cited
UNITED STATES PATENTS

| | | | |
|---|---|---|---|
| 3,221,871 | 12/1965 | Hidding | 206/16.5 |
| 3,251,463 | 5/1966 | Bodet | 206/56 AB |
| 3,235,063 | 2/1966 | Jarund | 206/16.5 |
| 3,221,555 | 12/1965 | Biber | 206/16.5 X |
| 3,416,651 | 12/1968 | Jarund | 206/16.5 X |

Primary Examiner—Samuel B. Rothberg
Assistant Examiner—Steven E. Lipman
Attorney—Owen, Wickersham & Erickson

[57] ABSTRACT

A disposable probe cover, comprising a flat bottom plastic sheet shaped generally like a probe and a flat upper plastic sheet overlying the bottom sheet and welded to it at its edges, except for an entrance opening at one end through which the probe is to be inserted. The upper plastic sheet stops short of the bottom plastic sheet at the entrance opening, and it is knurled at the entrance opening to help to provide an entrance guideway. A probe can make its initial contact along the guideway provided by the lower sheet beyond the entrance opening and when moved into the opening, the knurls provide gaps where the two sheets cannot stick together. Each probe cover may have its bottom sheet removably adhered to a paper backing, from which it is separated when the probe is inserted in the cover and is pulled away from the paper backing. In the method of making the probe cover, knurled rolls are used on one or two side edges of a continuous sheet which is to form many upper sheets of probe covers, and an entire knurled strip is provided before the two sheets and the paper backing are brought together. Then, after cutting, the probe covers result with the knurled portion of the upper sheet adjacent to the entrance opening.

2 Claims, 7 Drawing Figures

Patented Sept. 18, 1973
3,759,370
2 Sheets-Sheet 1
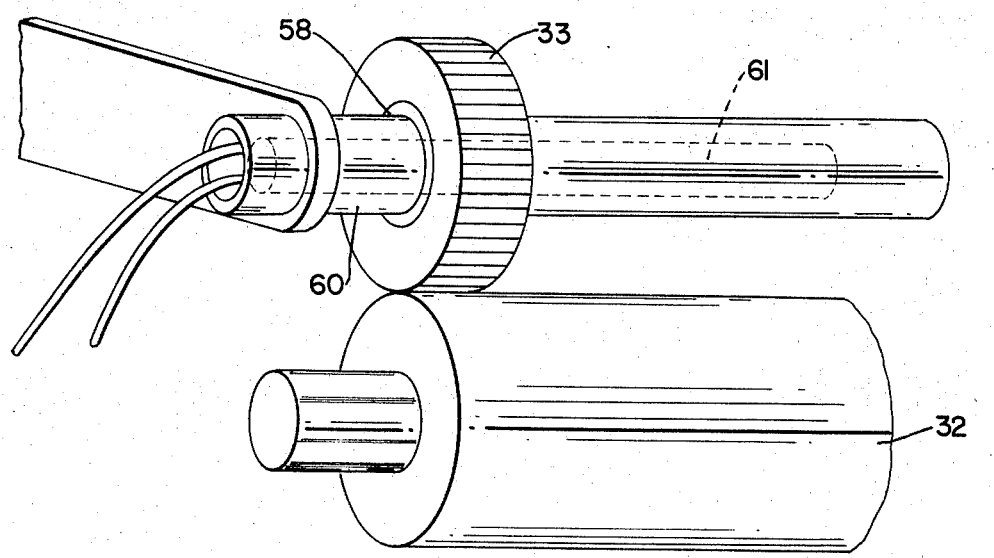
FIG_7
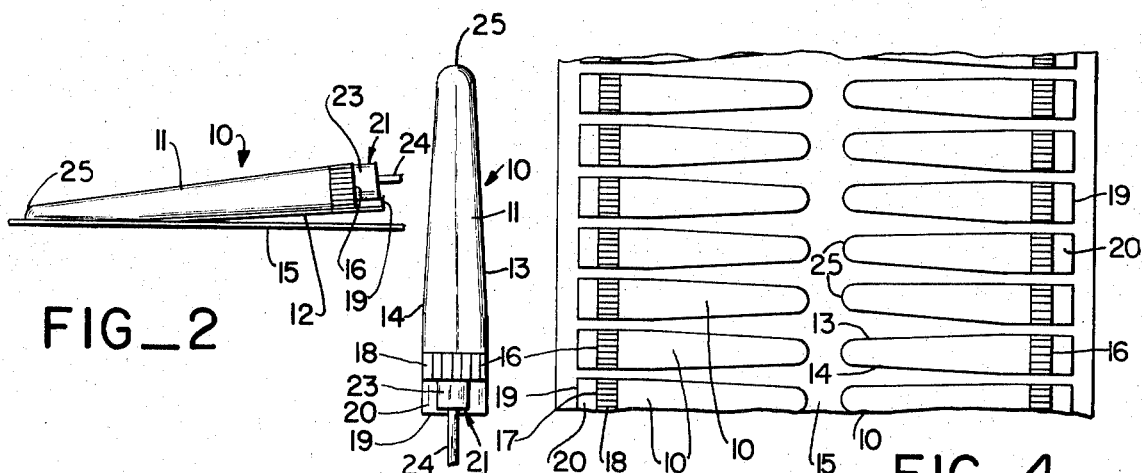
FIG_2  FIG_3  FIG_4
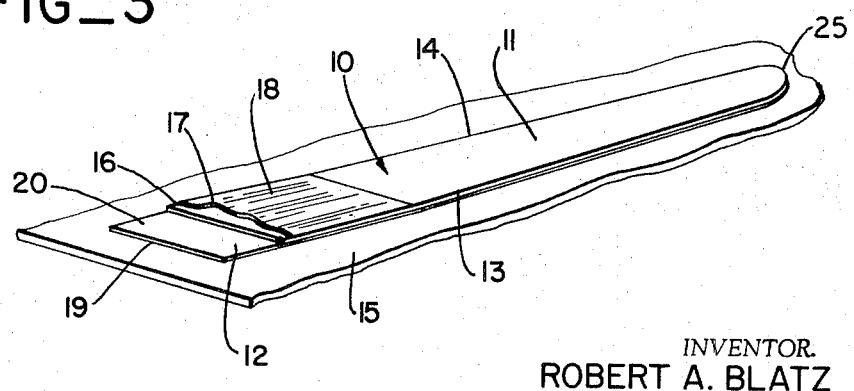
FIG_1
INVENTOR.
ROBERT A. BLATZ
BY
Owen, Wickersham & Erickson
ATTORNEYS Patented Sept. 18, 1973
3,759,370
2 Sheets-Sheet 2
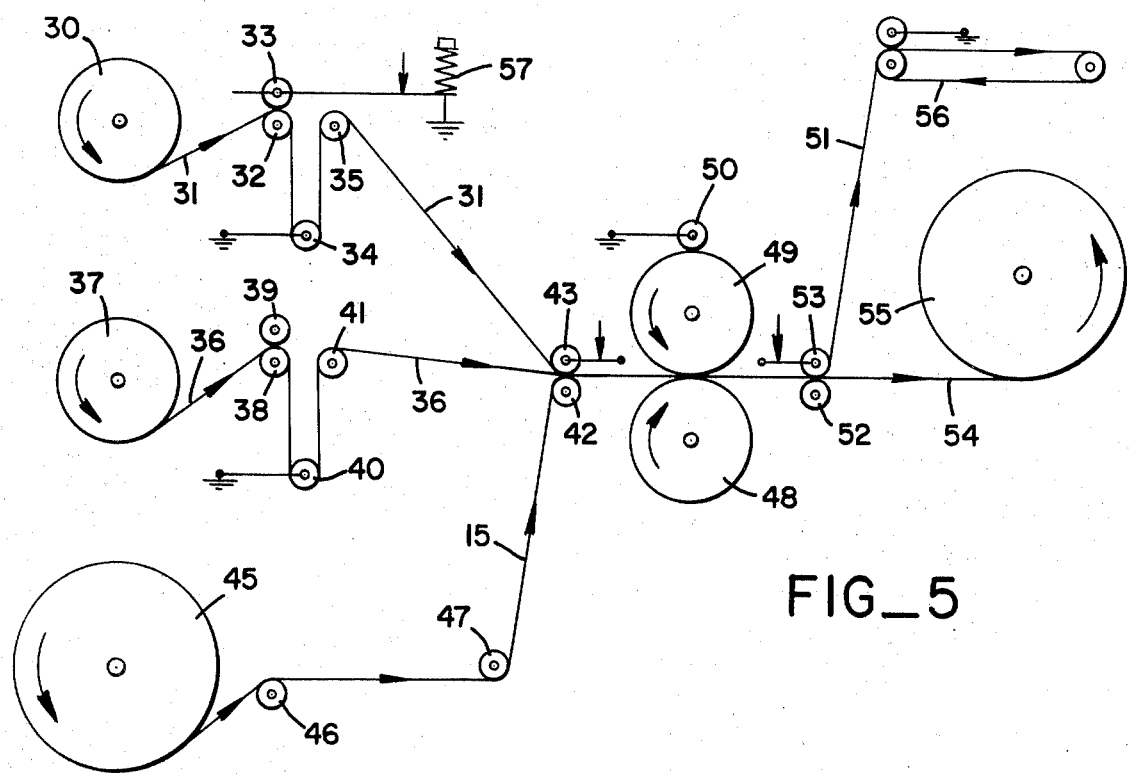
FIG_5
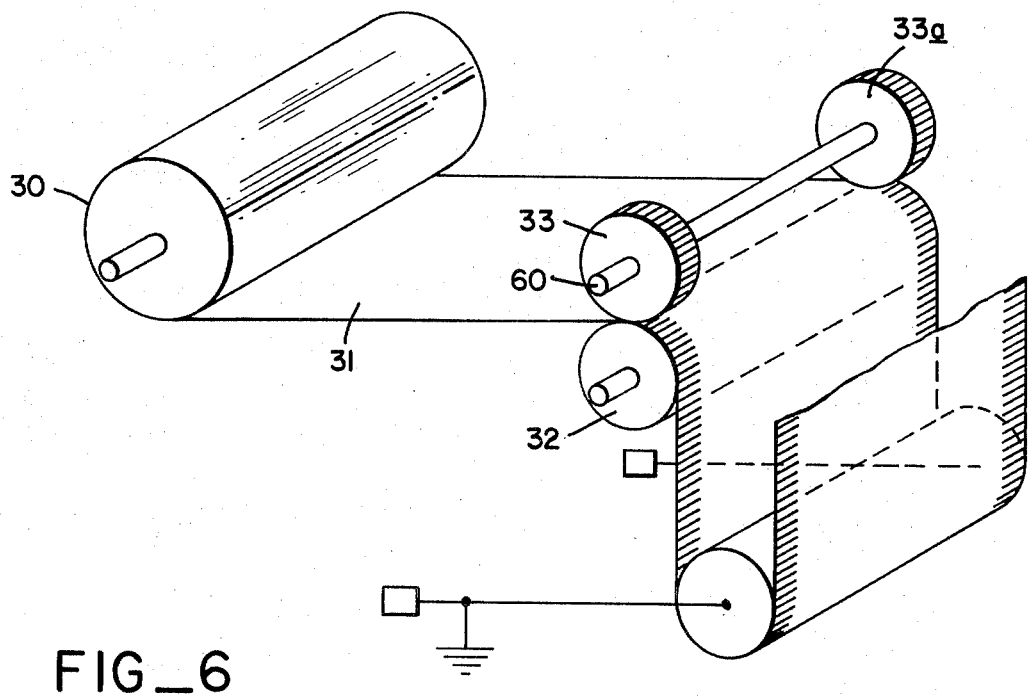
FIG_6
INVENTOR.
ROBERT A. BLATZ
BY
Owen, Wickersham & Erickson
ATTORNEYS

3,759,370

DISPOSABLE PROBE COVER AND METHOD FOR MAKING SAME

BACKGROUND OF THE INVENTION

This invention relates to a disposable probe cover and to a method for making the probe cover.

Clinical thermometers, whether oral or anal, have been considered serious disseminators of disease because of the difficulty of sterilization between successive patients. Even the most modern electronic thermometers present the same problems of sterility and cross-contamination as do older types.

Individually disposable sterilized probe covers have been used to cover the thermometer probe and to minimize the risk of cross-infection between patients. These probe covers are thrown away after one use. However, the probe covers have generally had to be put onto the probe by hand, and installation has therefore led to another source of contamination, — substantially as if the operator handled the thermometer with his hand before putting it into the patient's mouth.

The probe cover of the present invention, which can be used either with oral or anal thermometers, can readily encase the probe of the thermometer without anyone touching it. The probe cover may be supported upon a paper base, and usually many probe covers are supported upon a continuous paper strip. A probe is inserted into one of them with the aid of a guideway portion of the cover and with a knurled upper edge of the upper sheet, so that the probe is readily guided into the space between the upper and lower surfaces of the probe cover. The article of this invention not only covers the portion of the probe which enters the patient's mouth but also a portion above it, and the cover is shaped accordingly. The invention fits a wide variety of probes, whether the probe is round or flat, steel or plastic or plastic and copper and so on.

Plastic materials of the type from which such probe covers can economically and practically be made are thermoplastic. The invention takes advantage of this, since it is difficult to knurl a piece of plastic, and it uses heat in conjunction with a knurling roll. It also achieves the knurling before the probe cover is made, so that there will be no knurling of the lower sheet and so that operation can be done with extreme economy.

SUMMARY OF THE INVENTION

Both the flat bottom plastic sheet and the flat upper plastic sheet are shaped generally like the probe, the upper sheet overlying the bottom sheet and being welded to it at its edges except at one end. The bottom sheet is preferably supported on a paper backing, and preferably there is a continuous paper backing carrying a series of probe covers, which may be arranged either in alternate directions or in the same direction. The open end of the upper plastic sheet stops short of the edge of the bottom plastic sheet to help provide an entrance guideway portion on the bottom sheet. The margin of the upper sheet adjacent to the opening is knurled, so that it tends to stand away from the lower plastic sheet. The probe makes its initial contact with the bottom sheet and is thereby led into the probe cover between the sheets, with no difficulty being experienced and no tendency to glide over the upper sheet as soon as it reaches it. The knurling provides a very convenient way of obtaining ready entrance without any decrease of sterilization. Once the probe cover is inside, it is readily lifted from the backing by the probe.

In the method of manufacture, one or two heated knurling rolls are used in conjunction with a rubber-covered roller that allows the knurling wheel to impress. The heat of the knurling wheel is preferably controlled by the resistance of a thermo-couple or another suitable temperature regulation means. The upper plastic sheet, before being made into the probe cover, is passed as a sheet between the knurling roll and the rubber-covered driving roller, so that a complete marginal portion along one edge — or in some cases along two opposite edges — is knurled, the heat and the shape of the knurling wheel forming the thermo-plastic sheet so that the knurling remains permanent on the plastic. Then when the two plastic sheets are put together, together with the paper sheet, the two plastic sheets then are welded together along their edges, except at this knurled portion along the edge that is to be the entrance edge. Then the machine is forced between a die and anvil roller to cut the probe covers to shape, preferably at the same time as the welding operation. In fact, heat may be used both to weld and to cut at this point. The waste is carried away, and the product is rewound in a roll ready for distribution.

BRIEF DESCRIPTION OF THE DRAWINGS

Other objects and advantages of the invention will appear from the description of the preferred embodiment in connection with the following drawings in which:

FIG. 1 is a view in perspective of a probe cover embodying the principles of the invention and supported on backing paper.

FIG. 2 is a view in side elevation showing a probe fully inserted into the probe cover, while the probe cover is being lifted from the paper backing.

FIG. 3 is a top plan view of the assembly of FIG. 2.

FIG. 4 is a top plan view of a portion of a continuous sheet comprising two rows of probe covers made according to the present invention and supported on the same sheet of paper backing.

FIG. 5 is a diagrammatic view in side elevation of a manufacturing apparatus embodying the principles of the invention.

FIG. 6 is an enlarged but still simplified diagrammatic isometric view of the knurling portion of the apparatus.

FIG. 7 is a further enlarged detailed view of the knurling apparatus of FIG. 6.

DESCRIPTION OF A PREFERRED EMBODIMENT

A probe cover 10 is shown in FIGS. 1 through 4 and is made from two plastic sheets 11 and 12 both cut to shape and overlying each other. An upper sheet 11 not only overlies the lower sheet 12 but is welded to it at the side edges 13 and 14. Preferably the probe cover 10 is shaped as shown with a taper between one end and the other, so that it is wider at the entrance opening and narrower at the closed end. The bottom sheet 12 is removably held to a paper base 15 from which it is readily removed after insertion of the probe.

The only place where the two sheets 11 and 12 are not welded together at the edges is at an opening 16 where the edge 17 of the upper sheet 11 is left free. A marginal portion 18 of the upper sheet 11 lying along and extending for a short distance away from the edge of 17 is knurled, so that it presents a generally wrinkled shape and stands away from the lower sheet 12 without anyone having to achieve its separation by prying the sheets apart during installation of the probe. This is a very important feature of the present invention. It makes it very much easier to install a probe through the opening. The uppe sheet 11 is purposely somewhat shorter than the lower sheet 12, as can be seen from the drawings, with its upper edge 17 spaced from the edge 19 of the bottom sheet 12. The portion 20 of the bottom sheet 12 that lies beyond the edge 17 of the upper sheet 11 is used as a guideway to help guide a probe 21 into position.

The probe 21 generally has a wire-like thermometric terminal portion (fully covered by the probe cover 10 in FIGS. 2 and 3) and a handle portion 23, partially covered in FIGS. 2 and 3. An insulated wire lead 24 goes to a jack (not shown) that may be plugged into a box with a galvanometer-like circuit inside and a needle for indicating the temperature on i calibrated dial. For installation, the wire-like portion is first placed on top of the guideway portion 20. It is then slid along it and beneath the sheet 11 at the edge 17 to enter between the knurled marginal portion 18 and the lower sheet 12. This makes entrance quite easy. Then the probe 21 is pushed in until it reaches the end 25 of the cover 10, as shown in FIGS. 2 and 3. Then, as shown in FIG. 2, the probe 21 is used to lift the probe cover 10 from its paper backing 15, and the covered probe 21 is then ready for use.

When the covered probe 21 is inserted into a patient's mouth, the patient's mouth is protected from direct contact with the probe 21 and vice versa by means of the probe cover 10, which is sterile and has never been touched. When the temperature is taken, the probe 21 is removed from the patient's mouth, the cover 10 is then taken off by hand and thrown away, and the probe 21 is inserted into another cover 10 just prior to use on the next patient.

Although an anal probe differs from an oral probe by having an angled wire-like end portion, the probe cover 10 of this invention is usable in either type of probe without change in shape, since it is plastic, preferably polyethylene, which readily conforms to any special shape of the probe's wire-like portion.

It is convenient for the probe covers 10 to be presented in series individually detached from each other on a long paper strip 15 from which they are removable. They may be in a single row or may, as shown in FIG. 4, be a double row. Preferably, in a double row their entrance openings 16 face along the outer edges of the sheet 15.

Since the important advantages of knurling have been explained it remains to explain how the knurling may be achieved and how the probe cover 10 can be made sterile from the beginning and with the knurls 18 there they belong at the upper edge 16 of the upper sheet 11 only.

FIG. 5 shows in diagrammatic form substantially the complete manufacturing process. A roll 30 of plastic, such as polyethylene, is provided for the upper sheet 11 and from it a sheet 31 passes between a resilient-surfaced driving roll 32 and a heating knurling roll 33, which will be explained subsequently. Then the sheet 11 passes down under a spring-urged floater 34 that maintains tension, up over a guide roll 35 and down.

A lower sheet 33 of plastic, similarly unree'ed from a roll 37 of similar plastic material, is sent between a drive roll 38 and an idler roll 39, but there is no knurling and no heating. A floater 40 once again maintains tension, and the strip 36 passes over a guide roll 41 and between a drive roll 42 and an idler roll 43, where the two sheets 31 and 36 are joined together and to a paper sheet 15.

Simultaneously, a roll 45 of paper backing material 15 is unreeled, and the sheet 15 is passed by meansoF a suitable guide roll 46 and tension roll 47, as desired, to the two uniting guide rolls 42 and 43 comprising the driver and the idler, Where the three sheets 31, 36, anx 15 are brought together in stacked relationship.

The three sheets 31, 36, and 15 having been united together by the rolls 42 and 43 are then passed between an anvil roller 48 and a heated die 49. The heated die is kept from sticking by a constant application of silicone mold release material or other suitable mold release material as bY a roller 50. The heated die 49 should do three things: join together the edges 12 and 13 of the two plastic sheets 31 and 36 in the shape of the probe covers 10, tightly tack the lower plastic sheets 12 to the paper 15, and cut waste material 51 away from the probe covers 10. After passing through this very important step, the material passes through a second pair of guide rolls 52 and 53 comprising a driver 52 and an idler 53, and the product 54 is then wound up on a suitable rewind roll 55, while the waste 51 is carried to a conveyor 56 where it can be taken care of in whatever manner is desired.

FIGS. 6 and 7 show more details of the knurling operation. FIG. 6 shows that there may be two knurling rollers 33 and 33a, one for each edge of the sheet 31. This is used where, as in FIG. 4, there are two sets of probe covers 10 on one sheet 15, each having a knurled edge 18 adjacent to the opening 16 along the upper sheet 11. If there were to be only one strip of probe covers 10 on the paper 15, then there would be only one knurling roll 33.

The kurling rolls 33 and 33a are heated, and they idle under pressure, as indicated diagrammatically in FIG. 5 where spring means 57 is used to apply the pressure. The knurling grooves may be about 1/16 inch wide and 1/16 inch deep. Other proportions are workable as long as they are not too far away from this. The knurled edge 18 is caused by the wheel 33 resulting in a permanent compression by heat and by pressure, stretching the film 31 in a pleated manner. To enable this to happen, the drive roller 32 is rubber covered so that the knurling wheel 33 can press the plastic 31 into it.

The knurling wheel 33 or 33a itself may comprise a knurled sleeve of steel pressed on a roller bearing 58 which is mounted on a hollow shaft 60. A tube heater 61 in the hollow shaft 60 heats the knurling wheel 33 and may be controlled by the resistance of a thermocouple.

It will be appreciated then that the invention provides a means for providing probe covers 10 made from plastic sheets so that they can be made in quantity at very low cost, while also providing the knurled surface 18 on the upper sheet 11 only and that, only adjacent to the opening 16, so that easy entrance to the probe cover 10 is attained.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. An article for individually dispensing a series of disposable probe covers including in combination:
   a paper backing sheet,
   a series of identical flat bottom plastic sheets, each shaped generally like a probe, releasably supported on one face of said paper backing sheet,
   a series of identical flat upper plastic sheets, each overlying a said bottom sheet and welded to it at its edges, except for an entrance opening at one end, through which a probe may be inserted,
   each said upper plastic sheet having a knurled marginal portion lying along the edge of the entrance opening, so that it stands away from its related bottom plastic sheet,
   each said upper plastic sheet stopping short of the corresponding edge of its related bottom plastic sheet at the entrance opening, so that the bottom plastic sheet provides an entrance guideway extending beyond the end of the upper plastic sheet, upon which a probe can make an initial contact and be led into the probe cover in between the sheets at the knurled portion of the upper sheet,
   whereby said probe can be inserted into said probe cover and the probe cover removed from said paper backing sheet without having to touch said probe cover with the hands, so that the sterility of the exterior of the probe cover is not affected by the emplacement of the probe.

2. The article of claim 1 wherein there are two rows of probe covers on said paper backing sheet, each with said entrance opening near an edge of said paper backing sheet.

* * * * *